US009116224B2

(12) United States Patent
Kishinami et al.

(10) Patent No.: US 9,116,224 B2
(45) Date of Patent: Aug. 25, 2015

(54) ELECTRONIC DEVICE

(75) Inventors: Yuichiro Kishinami, Kanagawa (JP); Yasuharu Onishi, Kanagawa (JP); Motoyoshi Komoda, Kanagawa (JP); Yukio Murata, Kanagawa (JP); Jun Kuroda, Kanagawa (JP); Shigeo Satou, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/238,938

(22) PCT Filed: Jul. 31, 2012

(86) PCT No.: PCT/JP2012/004869
§ 371 (c)(1),
(2), (4) Date: Feb. 14, 2014

(87) PCT Pub. No.: WO2013/024573
PCT Pub. Date: Feb. 21, 2013

(65) Prior Publication Data
US 2014/0192616 A1  Jul. 10, 2014

(30) Foreign Application Priority Data
Aug. 16, 2011  (JP) .................................. 2011-177961

(51) Int. Cl.
*G01S 7/52* (2006.01)
*G01S 15/02* (2006.01)
(Continued)

(52) U.S. Cl.
CPC . *G01S 7/52* (2013.01); *G01S 11/14* (2013.01); *G01S 15/02* (2013.01); *G10K 11/18* (2013.01); *G10K 15/02* (2013.01); *H04R 2217/03* (2013.01)

(58) Field of Classification Search
CPC .......... G10K 15/02; G10K 11/18; G01S 7/52; G01S 15/02; G01S 11/14; H04R 2217/03
USPC .................................. 367/7, 137, 118, 11, 92
See application file for complete search history.

(56) References Cited

U.S. PATENT DOCUMENTS

| 7,773,761 B2 * | 8/2010 | Sun et al. ........................ 381/77 |
| 2005/0220311 A1 * | 10/2005 | Sun et al. ...................... 367/137 |
| 2014/0192616 A1 * | 7/2014 | Kishinami et al. ............ 367/137 |

FOREIGN PATENT DOCUMENTS

| JP | 02-265398 | 10/1990 |
| JP | 2003-520002 | 6/2003 |

(Continued)

OTHER PUBLICATIONS

International Search Report corresponding to International Application No. PCT/JP2012/004869, Sep. 11, 2012, 2 pages.

*Primary Examiner* — Daniel Pihulic
(74) *Attorney, Agent, or Firm* — Wilmer Cutler Pickering Hale and Dorr LLP

(57) ABSTRACT

Provided is an electronic device including a modulation unit (22) that modulates a sound signal to a modulation wave for a parametric speaker; an oscillator (12) to which the modulation wave is input; an equalizer (26) that corrects a frequency characteristic of a sound wave that is demodulated by the modulation wave; and a control unit (20) that selects a carrier frequency of the modulation wave and changes setting of the equalizer (26) on the basis of the selected carrier frequency. Thus, it is possible to provide the electronic device capable of correcting the frequency characteristic of the sound wave that is demodulated, for each carrier frequency of the modulation wave.

7 Claims, 10 Drawing Sheets

(51) Int. Cl.
*G01S 11/14* (2006.01)
*G10K 11/18* (2006.01)
*G10K 15/02* (2006.01)

(56) References Cited

FOREIGN PATENT DOCUMENTS

| JP | 2005-080227 | 3/2005 |
| JP | 2006-081117 | 3/2006 |
| JP | 2006-245731 | 9/2006 |
| JP | 2007-150798 | 6/2007 |
| JP | 2007-201624 | 8/2007 |
| JP | 2010-041167 | 2/2010 |
| WO | WO 2001/050810 A1 | 7/2001 |
| WO | WO 2013024573 A1 * | 2/2013 |

* cited by examiner

ELECTRONIC DEVICE

CROSS-REFERENCE TO RELATED APPLICATIONS

This application is a national stage application of International Application No. PCT/JP2012/004869 entitled "Electronic Device," filed on Jul. 31, 2012, which claims the benefit of the priority of Japanese patent application 2011-177961, filed on Aug. 16, 2011, the disclosures of each of which are hereby incorporated by reference in their entirety.

TECHNICAL FIELD

The present invention relates to an electronic device including an oscillator.

BACKGROUND ART

Techniques regarding a speaker have been examined variously, and include a technique using, for example, an oscillator that outputs ultrasound waves. It is possible to form a sound field having a high directivity by using an oscillator that oscillates ultrasound waves for sound reproduction using a speaker. Examples of a technique regarding a speaker using ultrasound waves include techniques disclosed in Patent Document 1 to Patent Document 3. All of Patent Document 1 to Patent Document 3 include techniques regarding a parametric speaker using a nonlinear phenomenon of ultrasound waves.

In the technique disclosed in Patent Document 1, phase adjustment of high-frequency carrier waves is controlled to change a direction of a sound which is emitted from a vibrator group. Patent Document 2 discloses that the frequency of carrier waves is changed and output in accordance with a distance to a target person. In the technique disclosed in Patent Document 3, a plurality of piezoelectric elements having different resonance frequencies are provided so as to allow a carrier wave to be selected.

RELATED DOCUMENT

Patent Document

[Patent Document 1] Japanese Unexamined Patent Publication No. H2-265398
[Patent Document 2] Japanese Unexamined Patent Publication No. 2005-80227
[Patent Document 3] Japanese Unexamined Patent Publication No. 2006-245731

DISCLOSURE OF THE INVENTION

In a parametric speaker, a carrier frequency of a modulation wave is selected, and thus it is possible to adjust the directivity of ultrasound waves that are output from an oscillator. However, a frequency characteristic of a sound wave that is demodulated is different for each carrier frequency that is selected.

An object of the invention is to provide an electronic device capable of correcting a frequency characteristic of a sound wave that is demodulated, for each carrier frequency of a modulation wave.

According to the invention, provided is an electronic device including a modulation unit that modulates a sound signal to a modulation wave for a parametric speaker; an oscillator to which the modulation wave is input; an equalizer that corrects a frequency characteristic of a sound wave that is demodulated by the modulation wave; and a control unit that selects a carrier frequency of the modulation wave and changes setting of the equalizer on the basis of the selected carrier frequency.

According to the invention, it is possible to provide an electronic device capable of correcting a frequency characteristic of a sound wave that is demodulated, for each carrier frequency of a modulation wave.

BRIEF DESCRIPTION OF THE DRAWINGS

The above-mentioned objects, other objects, features and advantages will be made clearer from the preferred embodiments described below, and the following accompanying drawings.

DESCRIPTION OF EMBODIMENTS

Figure 1:
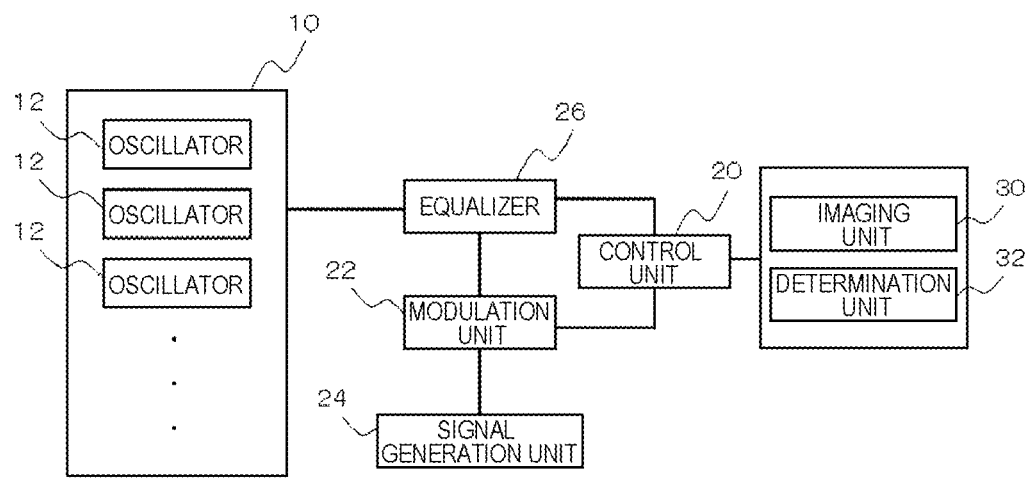
FIG. 1 is a block diagram illustrating an electronic device according to a first embodiment.

Hereinafter, embodiments of the invention will be described with reference to the accompanying drawings. In all the drawings, like elements are referenced by like reference numerals and descriptions thereof will not be repeated.

FIG. 1 is a block diagram illustrating an electronic device 100 according to a first embodiment. The electronic device 100 includes a modulation unit 22, an oscillator 12, an equalizer 26, and a control unit 20. For example, the electronic device 100 is a portable terminal device such as a cellular phone.

The modulation unit 22 modulates a sound signal to a modulation wave for a parametric speaker. The modulation wave is input to the oscillator 12. The equalizer 26 corrects a frequency characteristic of a sound wave which is demodulated by the modulation wave. The control unit 20 selects a carrier frequency of the modulation wave. In addition, the control unit 20 changes the setting of the equalizer 26 on the basis of the selected carrier frequency.

Hereinafter, the electronic device 100 according to this embodiment and a sound reproduction method using the electronic device 100 will be described in detail.

The electronic device 100 according to this embodiment performs sound reproduction using an operation principle of a parametric speaker. The operation principle of the parametric speaker is as follows. The parametric speaker performs sound reproduction based on a principle in which ultrasound waves on which an AM modulation, a DSB modulation, an SSB modulation, or an FM modulation is performed are emitted into the air and in which an audible sound is issued by a non-linear characteristic when ultrasound waves are propagated into the air. The term "non-linear" herein indicates a transition from a laminar flow to a turbulent flow when the Reynolds number expressed by the ratio of the inertial action and the viscous action of a flow increases. That is, since the sound wave is very slightly disturbed within a fluid, the sound wave is propagated non-linearly. Particularly, when the ultrasound waves are emitted into the air, high harmonic waves associated with the non-linearity are conspicuously generated. In addition, the sound wave is in a sparse and dense state in which light and shade occur in the molecular density in the air. When it takes time for air molecules to be restored rather than compressed, the air which is not capable of being restored after the compression collides with continuously propagated air molecules, and thus a shock wave occurs, thereby generating an audible sound.

Figure 2:
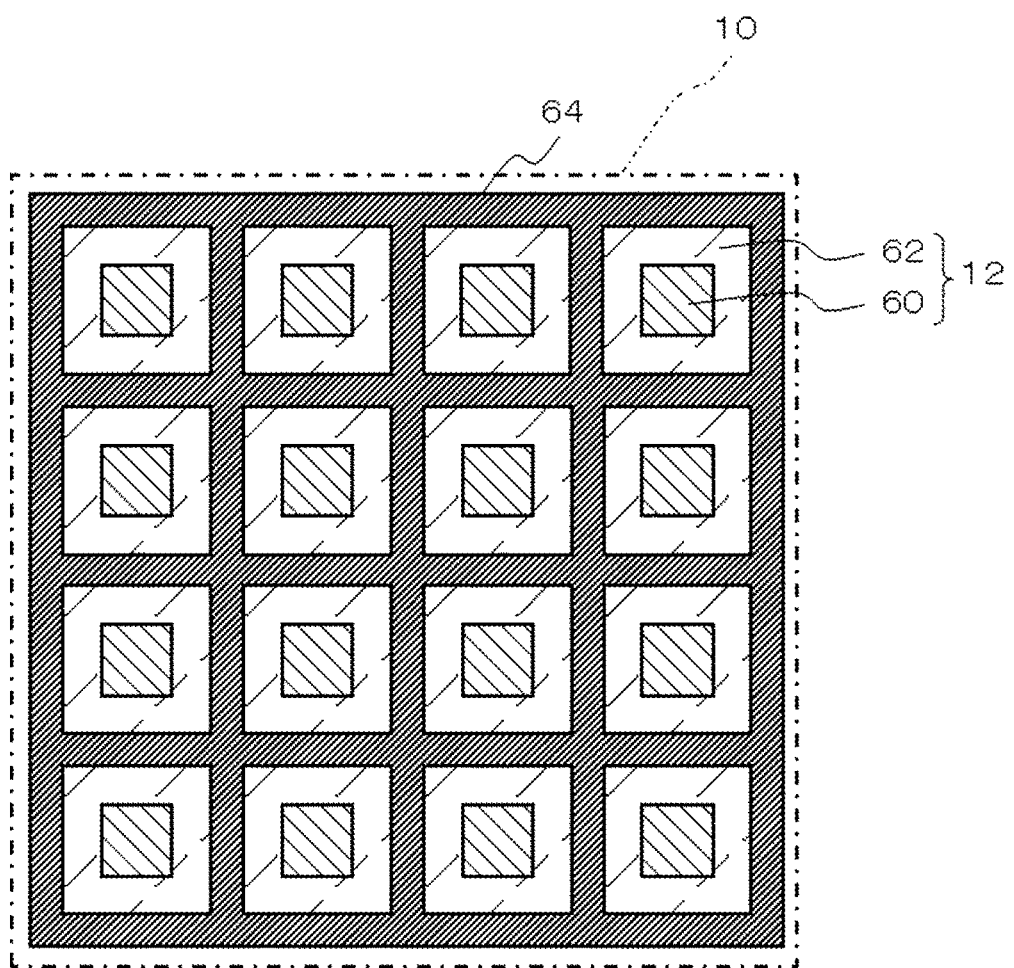
FIG. 2 is a plan view illustrating an array speaker shown in FIG. 1.

FIG. 2 is a plan view illustrating the array speaker 10 shown in FIG. 1. The electronic device 100 includes the plurality of oscillators 12. The plurality of oscillators 12 are arranged in the form of an array as illustrated in FIG. 2 to constitute the array speaker 10.

For example, the oscillators 12 are provided so that different modulation waves can be input thereto. In this case, phases of the modulation waves that are input to each oscillator 12 are controlled, and thus it is possible to control the directivity of ultrasound waves that are output from the array speaker 10.

Figure 3:
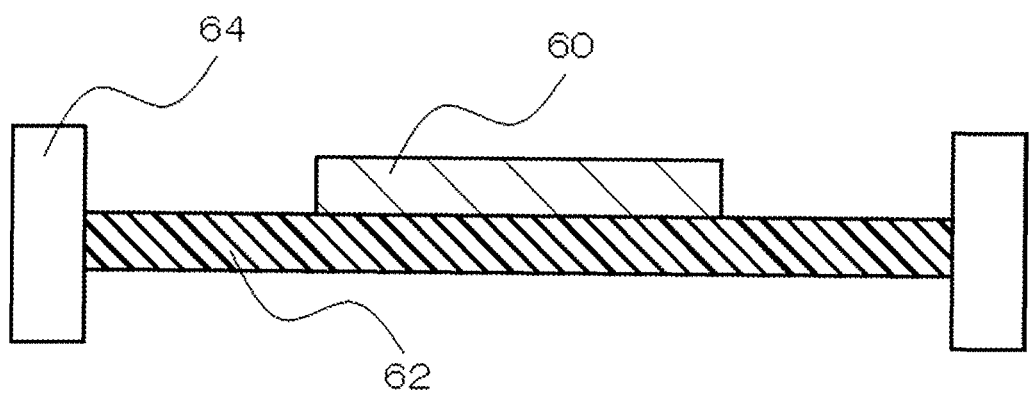
FIG. 3 is a cross-sectional view illustrating an oscillator shown in FIG. 1.

FIG. 3 is a cross-sectional view illustrating the oscillator 12 shown in FIG. 1. As illustrated in FIG. 3, the oscillator 12 includes a piezoelectric vibrator 60, a vibration member 62, and a supporting member 64. The piezoelectric vibrator 60 is provided on one surface of the vibration member 62. The supporting member 64 supports an edge of the vibration member 62. The vibration member 62 vibrates in response to expansion and contraction based on a piezoelectric effect of the piezoelectric vibrator 60, and thus ultrasound waves are output.

Figure 4:
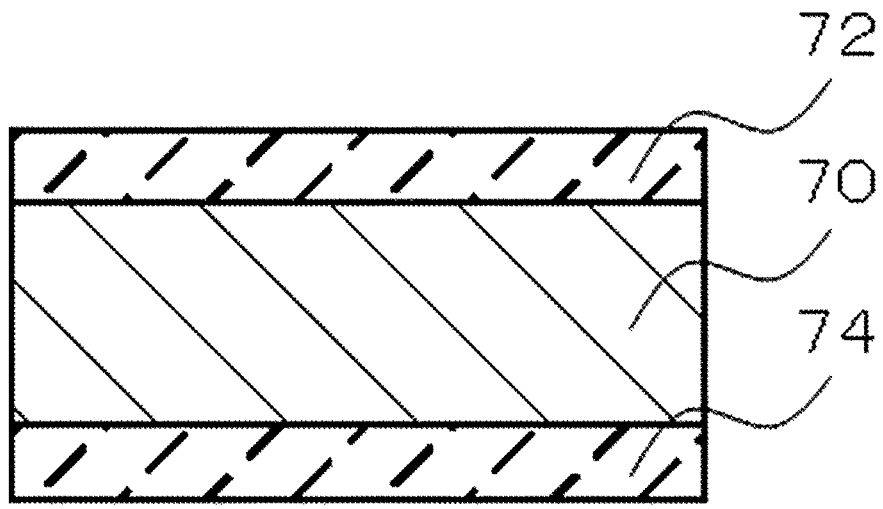
FIG. 4 is a cross-sectional view illustrating a piezoelectric vibrator shown in FIG. 3.

FIG. 4 is a cross-sectional view illustrating the piezoelectric vibrator 60 shown in FIG. 3. As illustrated in FIG. 4, the piezoelectric vibrator 60 includes a piezoelectric body 70, an upper electrode 72, and a lower electrode 74. In addition, for example, the piezoelectric vibrator 60 has a circular shape or an elliptical shape when seen in a plan view.

The piezoelectric body 70 is sandwiched between the upper electrode 72 and the lower electrode 74. In addition, the piezoelectric body 70 is polarized in the thickness direction thereof. The piezoelectric body 70 can be formed of a material having a piezoelectric effect. For example, the piezoelectric body 70 is formed of piezoelectric zirconate titanate (PZT) or barium titanate ($BaTiO_3$) which is a material having a high electro-mechanical conversion efficiency.

The thickness of the piezoelectric body 70 is preferably equal to or greater than 10 μm and equal to or less than 1 mm. When the thickness is less than 10 μm, the piezoelectric body 70 is formed of a brittle material, and thus damage is likely to occur at the time of handling. On the other hand, when the thickness exceeds 1 mm, the electric field intensity of the piezoelectric body 70 decreases, which results in a decrease in energy conversion efficiency.

The upper electrode 72 and the lower electrode 74 can be formed of a material having an electrical conduction property. The upper electrode 72 and the lower electrode 74 are formed of, for example, silver or a silver/palladium alloy.

Silver is a low-resistance versatile material. For this reason, when the upper electrode 72 and the lower electrode 74 are formed of silver, there is an advantage from the viewpoint of a manufacturing cost and a manufacturing process. In addition, the silver/palladium alloy is a low-resistance material excellent in oxidation resistance. For this reason, when the upper electrode 72 and the lower electrode 74 are formed of a silver/palladium alloy, it is possible to realize the piezoelectric vibrator 60 excellent in reliability.

The thicknesses of the upper electrode 72 and the lower electrode 74 are preferably equal to or greater than 1 μm and equal to or less than 50 μm. When the thickness is less than 1 μm, it becomes difficult to perform uniform molding. On the other hand, when the thickness exceeds 50 μm, the upper electrode 72 or the lower electrode 74 serves as a constraint surface with respect to the piezoelectric body 70, which results in a decrease in energy conversion efficiency.

The vibration member 62 can be formed of a material having a high elastic modulus with respect to ceramic which is a brittle material such as a metal or a resin. The vibration member 62 is formed of a versatile material, for example, phosphor bronze or stainless steel. The thickness of the vibration member 62 is preferably equal to or greater than 5 μm and equal to or less than 500 μm. In addition, a modulus of longitudinal elasticity of the vibration member 62 is preferably equal to or greater than 1 GPa and equal to or less than 500 GPa. When the modulus of longitudinal elasticity of the vibration member 62 is excessively low or excessively high, there is a possibility of the characteristics and reliability of a mechanical vibrator being damaged.

As illustrated in FIG. 1, the electronic device 100 includes a signal generation unit 24. The signal generation unit 24 is connected to the modulation unit 22. In addition, the signal generation unit 24 generates a sound signal. The sound signal generated by the signal generation unit 24 is modulated to a modulation wave for a parametric speaker by the modulation unit 22. The modulation wave for a parametric speaker has a carrier frequency of, for example, equal to or greater than 20 kHz.

The modulation unit 22 is connected to the equalizer 26. In this embodiment, the equalizer 26 corrects the modulation wave generated by the modulation unit 22 to correct a frequency characteristic of a sound wave which is demodulated by the modulation wave. The modulation wave corrected by the equalizer 26 is input to the oscillator 12. Thereafter, ultrasound waves corresponding to the modulation wave are output from the oscillator 12.

The control unit 20 is connected to the modulation unit 22. The control unit 20 selects a carrier frequency of the modulation wave generated by the modulation unit 22. The modulation unit 22 modulates the sound signal generated by the signal generation unit 24 to a modulation wave having the carrier frequency that is selected by the control unit 20. For example, the control unit 20 selects a carrier frequency corresponding to any one of a fundamental wave, a double wave, and a triple wave of the oscillator 12.

Figure 6:
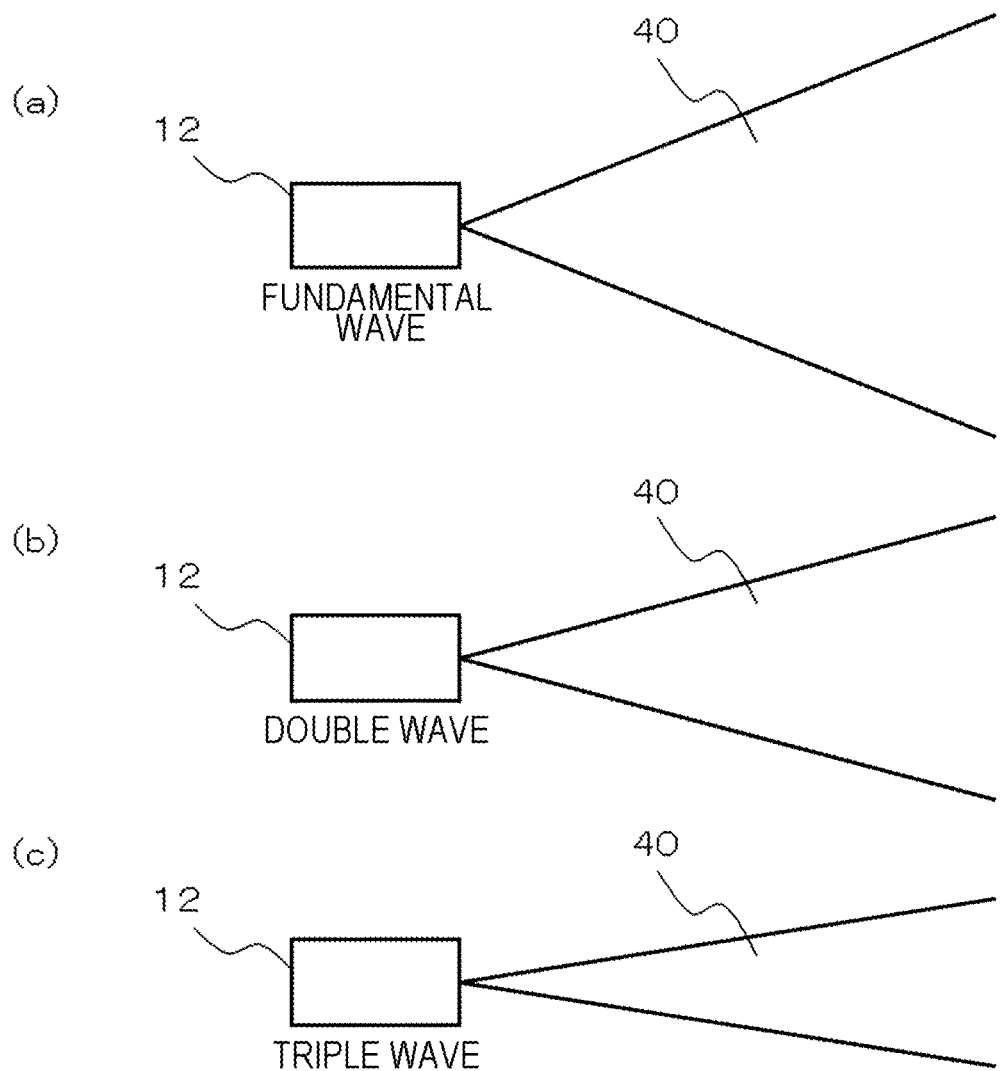
FIG. 6 is an explanatory diagram illustrating a method of controlling directivity according to the first embodiment.

FIG. 6 is an explanatory diagram illustrating a method of controlling directivity according to the first embodiment. FIG. 6 schematically illustrates a space 40 to which ultrasound waves output from the oscillator 12 are transmitted. In addition, FIG. 6 illustrates the directivity of the ultrasound waves output from the oscillator 12 when a carrier frequency of a modulation wave is a fundamental wave (FIG. 6(a)), a double wave (FIG. 6(b)), or a triple wave (FIG. 6(c)) of the oscillator 12.

As illustrated in FIG. 6, the directivity of the ultrasound waves output from the oscillator 12 increases with an increase in frequency. That is, the carrier frequency of the modulation wave is selected, and thus it is possible to control the directivity of the ultrasound waves that are output from the oscillator 12.

In addition, the control unit 20 is connected to the equalizer 26. The control unit 20 changes the setting of the equalizer 26 on the basis of the selected carrier frequency. Thus, it is possible to correct a frequency characteristic of the sound wave that is demodulated by the modulation wave generated by the modulation unit 22, for each carrier frequency of the modulation wave.

Figure 7:
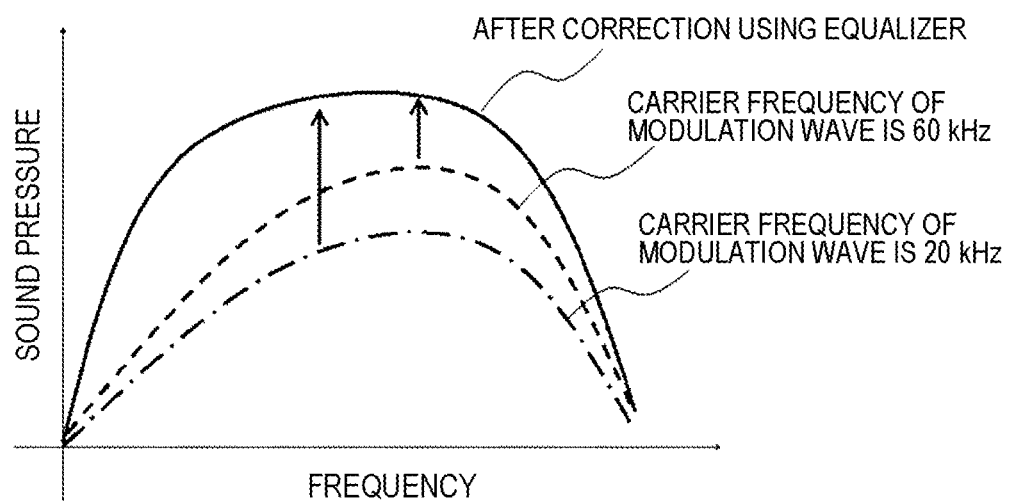
FIG. 7 is a graph illustrating correction of a frequency characteristic using an equalizer according to the first embodiment.

FIG. 7 is a graph illustrating the correction of a frequency characteristic using the equalizer 26 according to the first embodiment. FIG. 7 illustrates a frequency characteristic of a sound wave that is demodulated by a modulation wave when a carrier frequency of the modulation wave is 20 kHz and 60 kHz. The frequency characteristic in FIG. 7 is shown by frequency dependence of sound pressure.

As illustrated in FIG. 7, a frequency characteristic of a sound wave that is demodulated is different for each carrier frequency of a modulation wave. According to this embodiment, the setting of the equalizer 26 is changed on the basis of the selected carrier frequency. For this reason, it is possible to optimally correct a frequency characteristic in each carrier frequency. Thus, as illustrated in FIG. 7, even in a case where any carrier frequency is selected, it is possible to demodulate a sound wave having a similar frequency characteristic.

As illustrated in FIG. 1, the electronic device 100 includes an imaging unit 30 and a determination unit 32. The imaging unit 30 images a user and a region around the user to generate image data. The determination unit 32 processes the image data to determine the presence or absence of a person in the region imaged by the imaging unit 30. For example, the determination of the presence or absence of a person is performed by storing a feature amount for recognizing a person in advance and collating the feature amount with the image data.

The control unit 20 selects a carrier frequency on the basis of the presence or absence of a person in the region imaged by the imaging unit 30.

When a person is not present in the region around the user, a low carrier frequency can be selected. The impedance of the piezoelectric vibrator increases by lowering the carrier frequency. Thus, low power consumption can be realized.

In addition, when a person is present in the region around the user, a high carrier frequency can be selected. Thus, it is possible to increase the directivity of the ultrasound waves that are output from the oscillator 12. Therefore, a private sound heard by only a user is realized, and thus it is possible to provide an electronic device that is excellent from the viewpoint of privacy protection.

In addition, the determination unit 32 can also recognize the position of a user by processing image data. For example, the recognition of the position of the user is performed by storing a feature amount of the user in advance and collating the feature amount with the image data. Examples of the feature amount include the size of an interval between both eyes, the size of a triangle connecting both eyes and a nose, and the like.

The control unit 20 can adjust the directivity of the ultrasound waves output from the oscillator 12 so that a sound field is formed in a region including the recognized position of the user.

Figure 8:
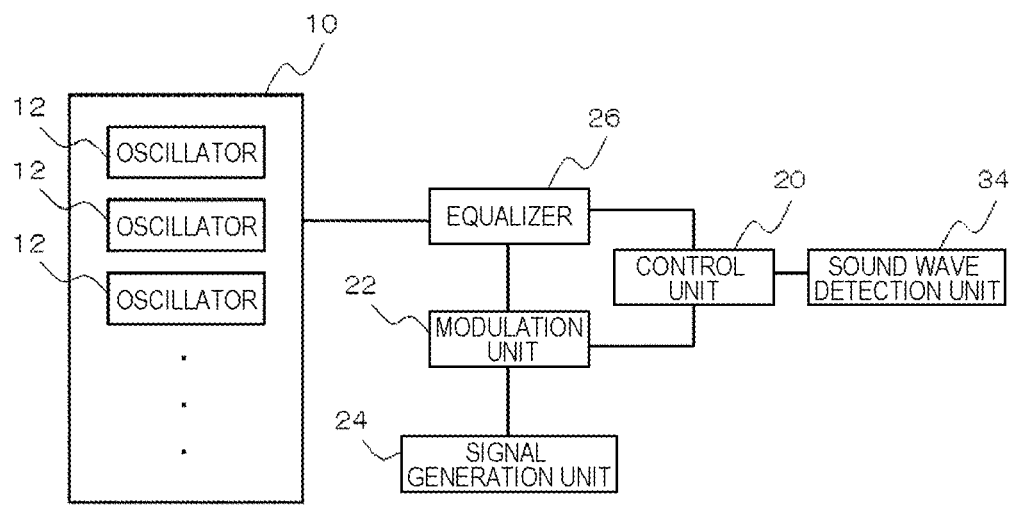
FIG. 8 is a block diagram illustrating a modified example of the electronic device shown in FIG. 1.

FIG. 8 is a block diagram illustrating a modified example of the electronic device 100 shown in FIG. 1. As illustrated in FIG. 8, the electronic device 100 may include, for example, a sound wave detection unit 34.

The sound wave detection unit 34 functions as, for example, a distance calculation unit that calculates a distance between a user and the oscillator 12. The calculation of the distance between the user and the oscillator 12 is performed, for example, as follows. First, ultrasound waves for a sensor are output toward the user from the oscillator 12. Subsequently, the ultrasound waves for a sensor which are reflected from the user are detected by the sound wave detection unit 34. Then, the distance between the user and the oscillator 12 is calculated on the basis of a time between when the ultrasound waves for a sensor are output by the oscillator 12 and when the ultrasound waves are detected by the sound wave detection unit 34.

The control unit 20 selects a carrier frequency of a modulation wave on the basis of the calculated distance between the oscillator 12 and the user. For example, it is possible to select the carrier frequency of the modulation wave so that the ultrasound waves output from the oscillator 12 reach the user.

In addition, the electronic device 100 may have two or more sound wave detection units 34. In this case, it is also possible to recognize the position of a user, using the sound wave detection unit 34.

The recognition of the position of the user using the sound wave detection unit 34 is performed, for example, as follows. First, a sound emitted from the user is detected by two or more sound wave detection units 34. The sound detected by the sound wave detection units 34 is collated with sound data which is previously stored. Then, a difference between a time when the sound emitted from the user reaches one sound wave detection unit 34 and a time when the sound reaches another sound wave detection unit 34 is obtained. The position of the user is specified on the basis of the difference in time.

Figure 5:
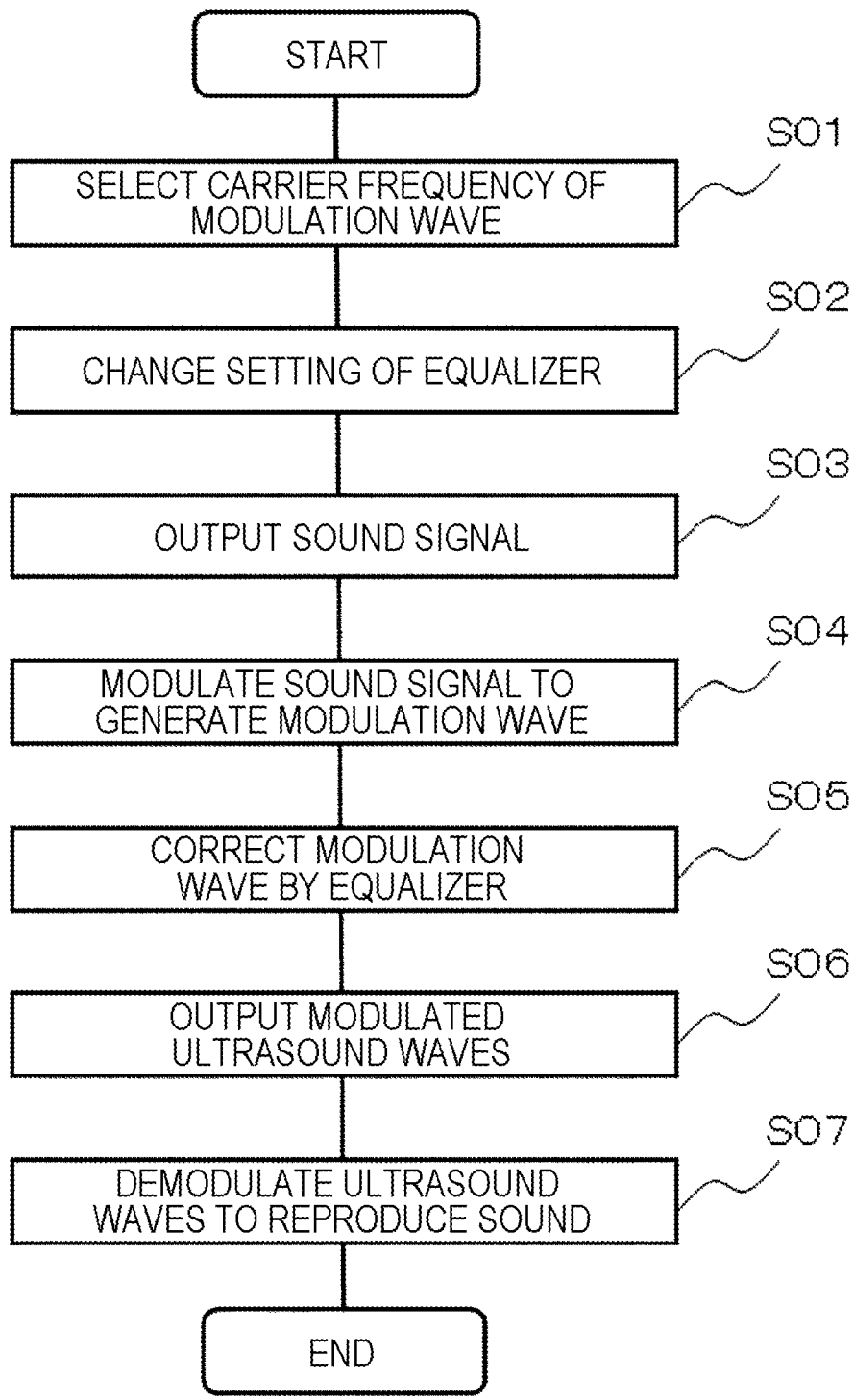
FIG. 5 is a flow chart illustrating a sound reproduction method using the electronic device according to the first embodiment.

Next, a sound reproduction method using the electronic device 100 according to this embodiment will be described. FIG. 5 is a flow chart illustrating the sound reproduction method using the electronic device 100 according to the first embodiment.

First, a carrier frequency of a modulation wave that is input to the oscillator 12 is selected by the control unit 20 (S01). The carrier frequency of the modulation wave is selected, and thus it is possible to adjust the directivity of ultrasound waves that are output from the oscillator 12. The carrier frequency of the modulation wave can be determined by, for example, the presence or absence of a person in a region around a user or a distance between the user and the oscillator 12.

Subsequently, the setting of the equalizer 26 is changed (S02). The setting of the equalizer 26 is changed by the control unit 20 on the basis of the selected carrier frequency.

Subsequently, a sound signal is output (S03). The sound signal is output by the signal generation unit 24. Next, the sound signal is modulated by the modulation unit 22 to generate a modulation wave (S04). Then, the modulation wave generated by the modulation unit 22 is corrected by the equalizer 26 (S05). Thus, a frequency characteristic of the sound wave demodulated by the modulation wave is corrected.

Subsequently, ultrasound waves corresponding to the modulation wave are output by the oscillator 12 (S06). Thereafter, the ultrasound waves are demodulated, and thus a sound is played back to the user (S07).

Next, effects of this embodiment will be described. According to this embodiment, the equalizer 26 corrects the frequency characteristic of the sound wave that is demodulated by the modulation wave. In addition, the control unit 20 selects a carrier frequency of the modulation wave and changes the setting of the equalizer 26 on the basis of the selected carrier frequency. For this reason, it is possible to optimally correct a frequency characteristic for each carrier frequency. Therefore, it is possible to provide an electronic device capable of correcting a frequency characteristic of a sound wave that is demodulated, for each carrier frequency of a modulation wave.

Figure 9:
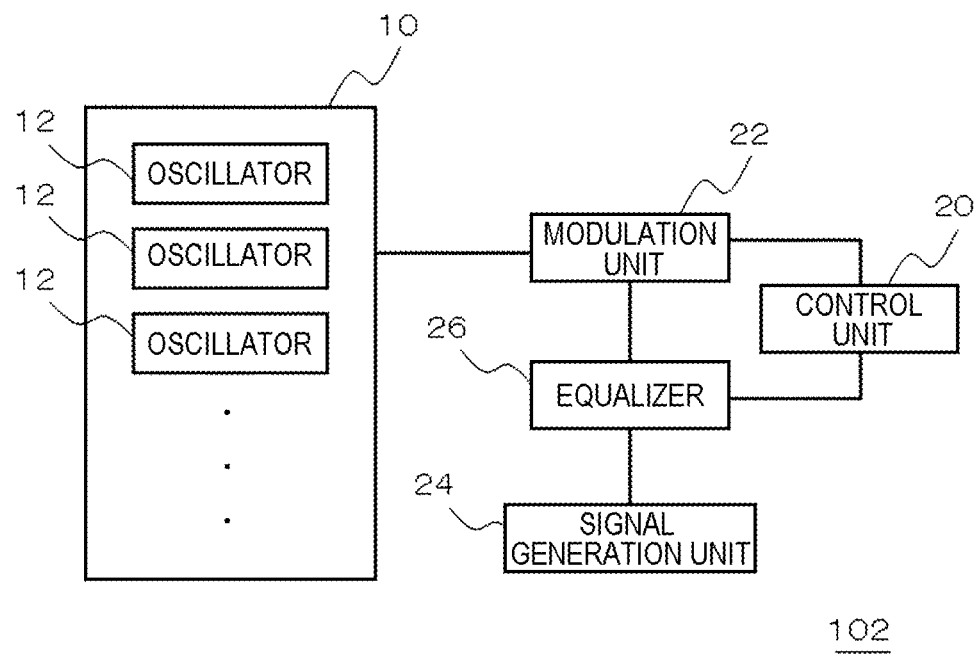
FIG. 9 is a block diagram illustrating an electronic device according to a second embodiment.

FIG. 9 is a block diagram illustrating an electronic device 102 according to a second embodiment, and corresponds to FIG. 1 according to the first embodiment. The electronic device 102 according to this embodiment has a similar configuration to that of the electronic device 100 according to the first embodiment, except for the configuration of an equalizer 26.

As illustrated in FIG. 9, in the electronic device 102 according to this embodiment, the equalizer 26 is connected to a signal generation unit 24. The equalizer 26 corrects a sound signal that is output from the signal generation unit 24 to correct a frequency characteristic of a sound wave that is demodulated by a modulation wave.

A modulation unit 22 modulates the sound signal corrected by the equalizer 26 to a modulation wave. The modulation wave generated by the modulation unit 22 is input to an oscillator 12.

Figure 10:
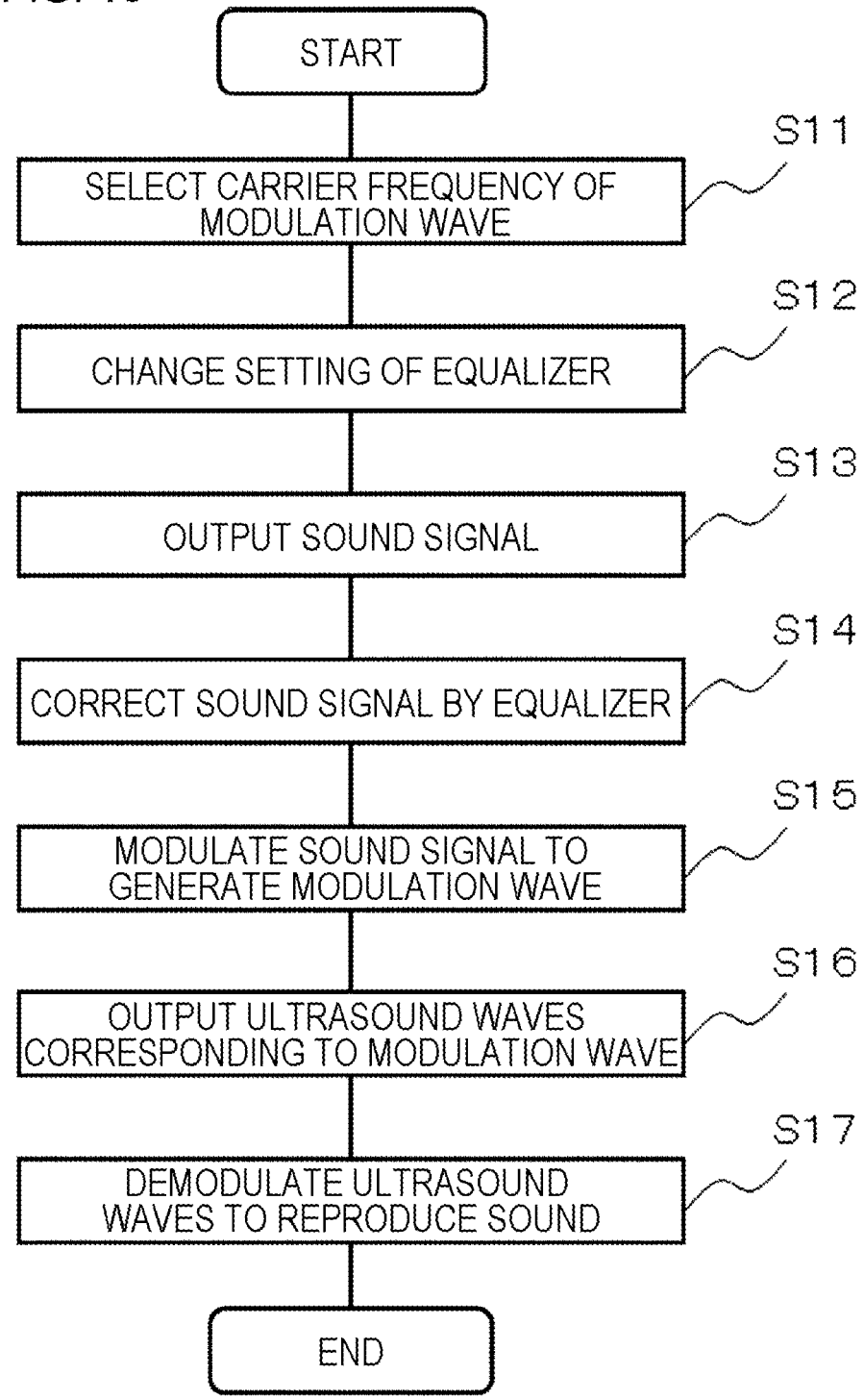
FIG. 10 is a flow chart illustrating a sound reproduction method using the electronic device according to the second embodiment.

Next, a sound output method using the electronic device 102 according to this embodiment will be described. FIG. 10 is a flow chart illustrating the sound output method using the electronic device 102 according to the second embodiment.

First, a carrier frequency of a modulation wave that is input to the oscillator 12 is selected by the control unit 20 (S11). Subsequently, the setting of the equalizer 26 is changed (S12). The setting of the equalizer 26 is changed by the control unit 20 on the basis of the selected carrier frequency. These processes can be performed in a similar manner to those in the first embodiment.

Subsequently, a sound signal is output (S13). The sound signal is output by the signal generation unit 24. Then, the sound signal generated by the signal generation unit 24 is corrected by the equalizer 26 (S14). Thus, a frequency characteristic of a sound wave that is demodulated by a modulation wave is corrected. Next, the sound signal is modulated by the modulation unit 22 to generate a modulation wave (S15).

Then, ultrasound waves corresponding to the modulation wave are output by the oscillator 12 (S16). Thereafter, the ultrasound waves are demodulated, and thus a sound is played back to a user (S17).

Effects similar to those in the first embodiment can also be obtained in this embodiment.

As described above, although the embodiments of the invention have been set forth with reference to the drawings, they are merely illustrative of the invention, and various configurations other than stated above can be adopted.

The application claims priority from Japanese Patent Application No. 2011-177961 filed on Aug. 16, 2011, the content of which is incorporated herein by reference in its entirety.

The invention claimed is:

1. An electronic device comprising:
   a modulation unit that modulates a sound signal to a modulation wave for a parametric speaker;
   an oscillator to which the modulation wave is input;
   an equalizer that corrects a frequency characteristic of a sound wave that is demodulated by the modulation wave;
   a control unit that selects a carrier frequency of the modulation wave and changes setting of the equalizer on the basis of the selected carrier frequency,
   an imaging unit that images a user and a region around the user; and
   a determination unit that determines the presence or absence of a person in the region imaged by the imaging unit,
   wherein the control unit selects the carrier frequency on the basis of the presence or absence of a person in the region.

2. The electronic device according to claim 1, wherein the equalizer corrects the modulation wave to correct the frequency characteristic of the sound wave that is demodulated by the modulation wave.

3. The electronic device according to claim 1, wherein the equalizer corrects the sound signal to correct the frequency characteristic of the sound wave that is demodulated by the modulation wave.

4. The electronic device according to claim 1, further comprising a distance calculation unit that calculates a distance between the user and the oscillator,
   wherein the control unit selects the carrier frequency on the basis of the distance between the oscillator and the user which is calculated by the distance calculation unit.

5. The electronic device according to claim 4,
   wherein the oscillator outputs ultrasound waves for a sensor toward the user, and
   wherein the distance calculation unit detects the ultrasound waves for a sensor which are reflected, and detects the distance between the user and the oscillator on the basis of a time between when the ultrasound waves for a sensor are output by the oscillator and when the ultrasound waves are detected.

6. The electronic device according to claim 1, wherein the control unit selects the carrier frequency corresponding to any one of a fundamental wave, a double wave, and a triple wave of the oscillator.

7. The electronic device according to claim 1, wherein the electronic device is a portable communication terminal.

* * * * *